(12) United States Patent
Ying

(10) Patent No.: US 12,617,322 B1
(45) Date of Patent: May 5, 2026

(54) PROTECTIVE COVER FOR AUTOMOBILE REAR SEAT

(71) Applicant: SHANGHAI JUN-DA AUTO DECORATION CO, LTD., Shanghai (CN)

(72) Inventor: Hongjie Ying, Xianju (CN)

(73) Assignee: SHANGHAI JUN-DA AUTO DECORATION CO., LTD, Shanghai (CN)

( * ) Notice: Subject to any disclaimer, the term of this patent is extended or adjusted under 35 U.S.C. 154(b) by 0 days.

(21) Appl. No.: 19/351,420

(22) Filed: Oct. 7, 2025

(30) Foreign Application Priority Data

Sep. 13, 2025  (CN) .......................... 202521975579.3

(51) Int. Cl.
B60N 2/60 (2006.01)

(52) U.S. Cl.
CPC ......... B60N 2/6027 (2013.01); B60N 2/6054 (2013.01); B60N 2/6063 (2013.01)

(58) Field of Classification Search
CPC ... B60N 2/6027; B60N 2/6054; B60N 2/6063
See application file for complete search history.

(56) References Cited

U.S. PATENT DOCUMENTS

| | | | | |
|---|---|---|---|---|
| 6,722,733 B2 * | 4/2004 | Schmidt | .............. | A47C 31/113 |
| | | | | 297/229 |
| 9,845,033 B1 * | 12/2017 | Umlauf | | |
| 11,345,265 B2 * | 5/2022 | Wang | ................... | B60N 2/6027 |
| 2023/0166645 A1 * | 6/2023 | Umlauf | .............. | B60N 2/6027 |
| | | | | 297/229 |

FOREIGN PATENT DOCUMENTS

DE           4238363  A1 *  5/1993

* cited by examiner

*Primary Examiner* — Anthony D Barfield

(57) ABSTRACT
This application discloses a rear-seat cover for a vehicle. The rear-seat cover comprises a seat-protecting portion, a backrest portion, a first connecting member, and a second connecting member. The backrest portion includes multiple sub-backrest units arranged sequentially along the length of the backrest portion, adjacent sub-backrest units being detachably connected. The angle between each pair of adjacent sub-backrest units adjusts in concert with the adjustment of the corresponding rear-seat backrest position, enabling the sub-backrest units to be detached and their angles changed to accommodate rear-seat backrest adjustments. This arrangement avoids inability to detach the sub-backrest units and improves the convenience of using the rear-seat cover. A vertically offset elastic-band fastening buckle is provided between the backrest portion and the seat-protecting portion; the fastening buckle connects respectively to the backrest portion and to the seat-protecting portion to adjust the height of the backrest portion relative to the vehicle's rear-seat backrest position.

10 Claims, 9 Drawing Sheets

PROTECTIVE COVER FOR AUTOMOBILE REAR SEAT

TECHNICAL FIELD OF THE INVENTION

The present utility model pertains to the field of rear-seat covers for automobiles, and in particular to a rear-seat cover for a vehicle's back row seating.

BACKGROUND OF THE INVENTION

With continuous advancements in automotive technology and increasing consumer demand for comfort and protection, the interior of vehicles, especially the rear seating area, has gained heightened attention. Rear seat protective covers have become widely used to shield vehicle seats from everyday wear, dirt, and fading, while also enhancing overall interior aesthetics through diverse designs and materials to meet personalized styling preferences.

Currently available rear seat covers typically include major components such as a seat-protecting portion and a backrest portion. Existing technologies often employ integrally fixed sub-backrest units that provide protection but lack the capability for detachment or angle adjustment in response to the adjustable rear seatback recline. This rigidity reduces convenience and adaptability to varying seat configurations, detracting from user experience.

Moreover, some seat covers incorporate zippers, elastic straps, or other attachment elements to secure and adjust the cover; however, these solutions frequently fall short in ease of disassembly and dynamic angle adjustment. This limitation is especially pronounced in multifunctional rear seats with armrests or segmented folding features, where traditional covers struggle to adapt flexibly, thus limiting their applicability across various vehicle models.

Therefore, the development of a rear-seat cover for automobiles featuring multiple sub-backrest units with detachable connections and angle adjustment capabilities has become crucial for enhancing product usability and accommodating various vehicle models. The present invention, through innovative connection structures and adjustment mechanisms, not only ensures secure installation of the cover but also improves the conformity and comfort of the seat backrest area, thereby greatly meeting the diverse protection needs of modern automotive rear seats.

SUMMARY OF THE INVENTION

The object of the present utility model is to provide a protective cover for an automobile rear seat. The cover comprises a seat-protection portion for fitting over the rear seat cushion to support the user's hips, and a backrest portion connected to one side of the seat-protection portion to fit against the rear seat back and support the user's back. The backrest portion is divided into multiple sub-backrest units arranged sequentially along its length, each pair of adjacent sub-backrest units being releasably connected. The angle between any two adjacent sub-backrest units adjusts automatically in accordance with the corresponding seat back recline, thereby allowing the sub-backrest units to be detached and re-angled to accommodate changes in the rear seat back position and greatly improving installation convenience. A first connecting member is attached around the perimeter of the seat-protection portion to secure it to the seat cushion, and a second connecting member is attached around the perimeter of the backrest portion to secure it to the seat back. By directly coupling both the seat-protection portion and the backrest portion to the vehicle seat via these first and second connecting members, installation of the protective cover onto the rear seat is greatly simplified.

To achieve the foregoing object, the present utility model provides the following technical solution: a protective cover for an automobile rear seat, comprising:

a seat-protection portion for fitting over the rear seat cushion and supporting the user's hips;

a backrest portion connected to one side of the seat-protection portion to fit against the rear seat back and support the user's back, the backrest portion being divided into multiple sub-backrest units arranged sequentially along its length, adjacent sub-backrest units being releasably connected so that their inter-unit angle adjusts in accordance with the corresponding seat back recline, and an offset elastic-band buckle connecting the backrest portion to the seat-protection portion so as to adjust the backrest portion's vertical position relative to the seat back;

First connecting member, attached around the perimeter of the seat-protection portion, for securing the seat-protection portion to the vehicle's rear seat cushion;

Second connecting member, attached around the perimeter of the backrest portion, for securing the backrest portion to the vehicle's rear seat back.

Optionally, the bottoms of two adjacent sub-backrest units are both fastened to the same seat-protection portion at different locations;

A zipper is provided between each pair of adjacent sub-backrest units for user operation, whereby pulling the zipper adjusts the opening angle between the two adjacent sub-backrest units to accommodate changes in the rear seat back position.

Optionally, gear-tooth tracks are formed on the facing sides of each pair of adjacent sub-backrest units, and the zipper is movably engaged with the gear-tooth tracks so as to be adjustable relative to the tracks.

Optionally, there are three sub-backrest units arranged side-by-side along the length of the backrest portion, the middle sub-backrest unit being collapsible when the zipper is adjusted, thereby providing an opening for the vehicle's center armrest and accommodating armrests of different sizes.

Optionally, the protective cover further includes a first flap connected to one of the sub-backrest units and pivotable rearward relative to that sub-backrest unit to conform to the edge of the vehicle's rear seat back.

The protective cover further includes a second flap connected to the seat-protection portion and pivotable downward relative to the seat-protection portion to conform to the edge of the vehicle's rear seat cushion.

Optionally, the protective cover further includes a front apron panel attached to a forward support arm of the seat-protection portion and pivotable downward relative to the seat-protection portion to conform to the front edge of the vehicle's rear seat cushion;

and a side shield connected to the second flap and pivotable relative to the second flap so as to wrap entirely around the inner side of the vehicle's rear seat.

Optionally, the seat-protection portion is provided with a belt-buckle through-hole for passing and exposing the vehicle's seat belt buckle.

Optionally, both the first connecting member and the second connecting member are slung over the rear of the vehicle seat, the second connecting member comprising an elastic band and a corresponding length-adjustment buckle for varying its effective length.

Optionally, each sub-backrest unit is equipped with a head-cap attached by the elastic band to the corresponding sub-backrest unit and configured to envelop the vehicle's headrest.

Optionally, each head-cap is removable from the vehicle's headrest.

Compared with the prior art, the present utility model offers the following advantages:

The protective cover for a vehicle's rear seat comprises a seat-protection portion that conforms to and supports a user's hips on the rear seat cushion, and a backrest portion secured to one side of the seat-protection portion to conform to and support the user's back against the rear seat back. The backrest portion is subdivided into multiple sub-backrest units arranged in sequence along its length, each adjacent pair of sub-backrest units joined by a detachable connection. The angle between each pair of adjacent sub-backrest units automatically adjusts in concert with the reclining of the vehicle's rear seat back, enabling both detachment and angular adjustment of the sub-backrest units to accommodate various seat-back configurations and thereby avoiding the immobility limitations of conventional designs and significantly improving user convenience. A first connecting member is attached around the perimeter of the seat-protection portion to secure it to the rear seat cushion, and a second connecting member is attached around the perimeter of the backrest portion to secure it to the rear seat back. By directly linking both the seat-protection portion and backrest portion to their respective seat structures, these connecting members greatly simplify installation of the protective cover relative to conventional rear seat protectors.

BRIEF DESCRIPTION OF DRAWINGS

To illustrate the technical solutions of the embodiments more clearly, the accompanying drawings used in the description of the embodiments are briefly introduced below. In the following description, identical reference numerals denote identical components. It is understood that the drawings described below are only some embodiments of the present application, and other drawings may be obtained by those of ordinary skill in the art without inventive effort.

Figure 1:
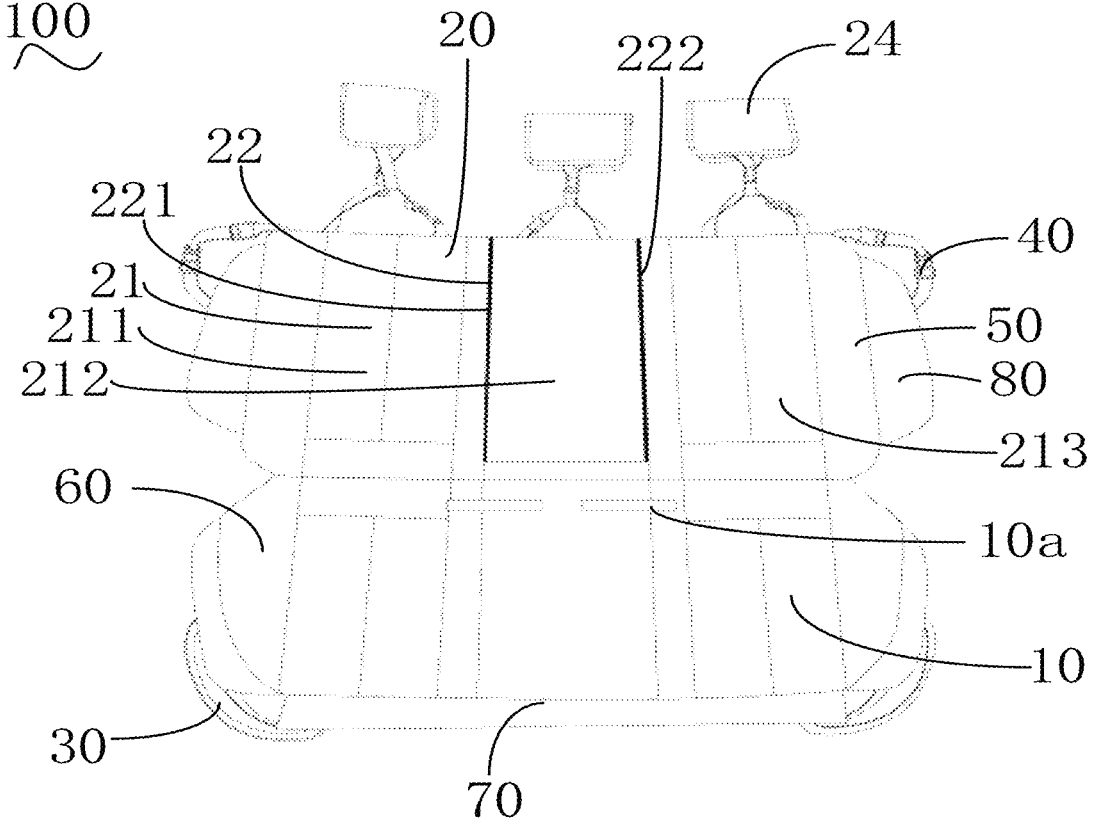
FIG. 1 is a front elevation view of a rear-seat protective cover according to one embodiment of the present application.

Reference Numerals: rear-seat protective cover (100); seat-protection portion (10); 10a-belt-buckle through-hole (10a); backrest portion (20); sub-backrest unit (21); first sub-backrest unit (211); second sub-backrest unit (212); third sub-backrest unit (213); zipper (22); first zipper (221); second zipper (222); zipper track (23); head-cap (24); retaining plate (25); first connecting member (30); second connecting member (40); elastic band (41); length-adjustment buckle (42); first flap (50); second flap (60); front apron panel (70); hook (71); side shield (80); third connecting member (90).

DETAILED DESCRIPTION OF THE INVENTION

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying Figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

The phrase "in one embodiment," as used herein does not necessarily refer to the same embodiment, although it may. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without operator input or prompting, whether these features, elements and/or states are included or are to be performed in any particular embodiment.

The following description refers to the accompanying drawings to provide a clear and complete disclosure of the technical solutions of the embodiments of the present application. It will be understood that the embodiments described herein are merely illustrative of a portion of the embodiments of the present application and are not intended to limit the scope thereof. Any other embodiments obtained by those of ordinary skill in the art based on the embodiments disclosed herein, without inventive effort, shall fall within the protection scope of the present application.

Figure 2:
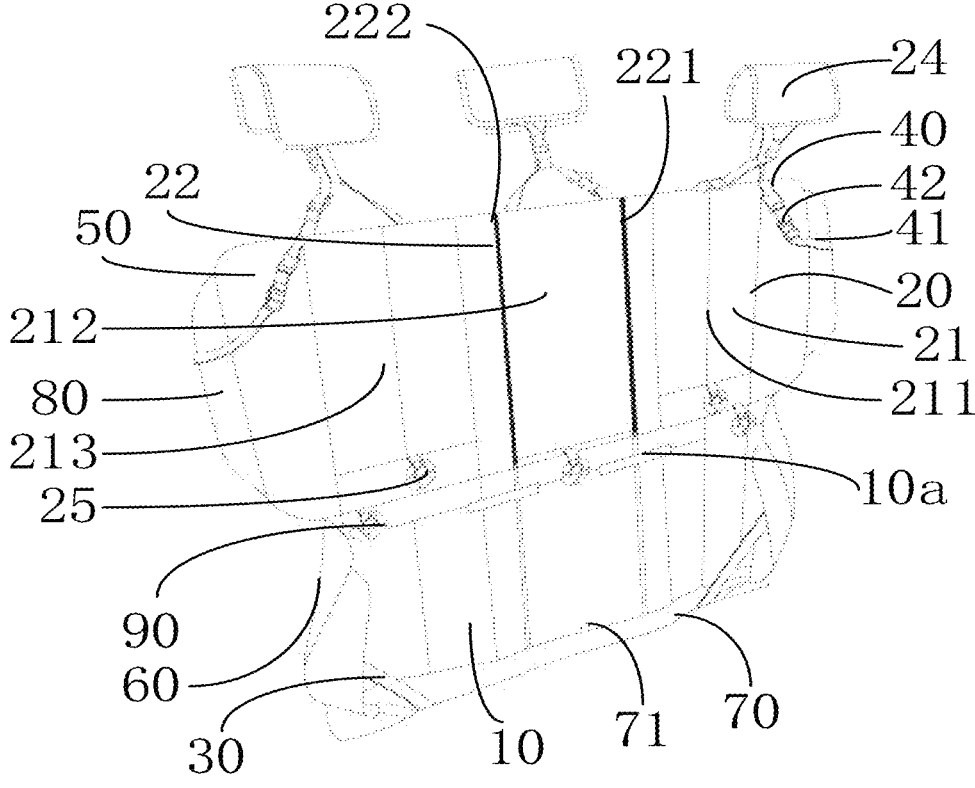
FIG. 2 is a schematic view showing another state of the rear-seat protective cover according to the same embodiment.
Figure 3:
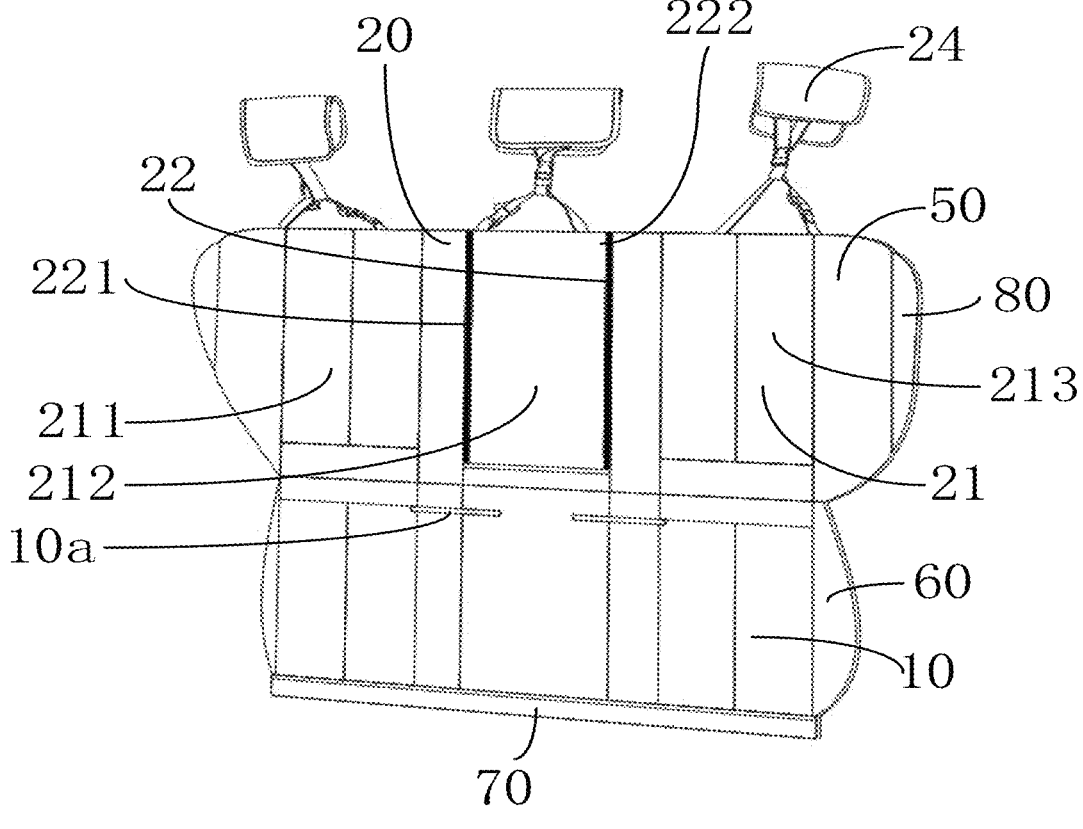
FIG. 3 is a schematic diagram of the rear-seat protective cover according to the same embodiment.
Figure 4:
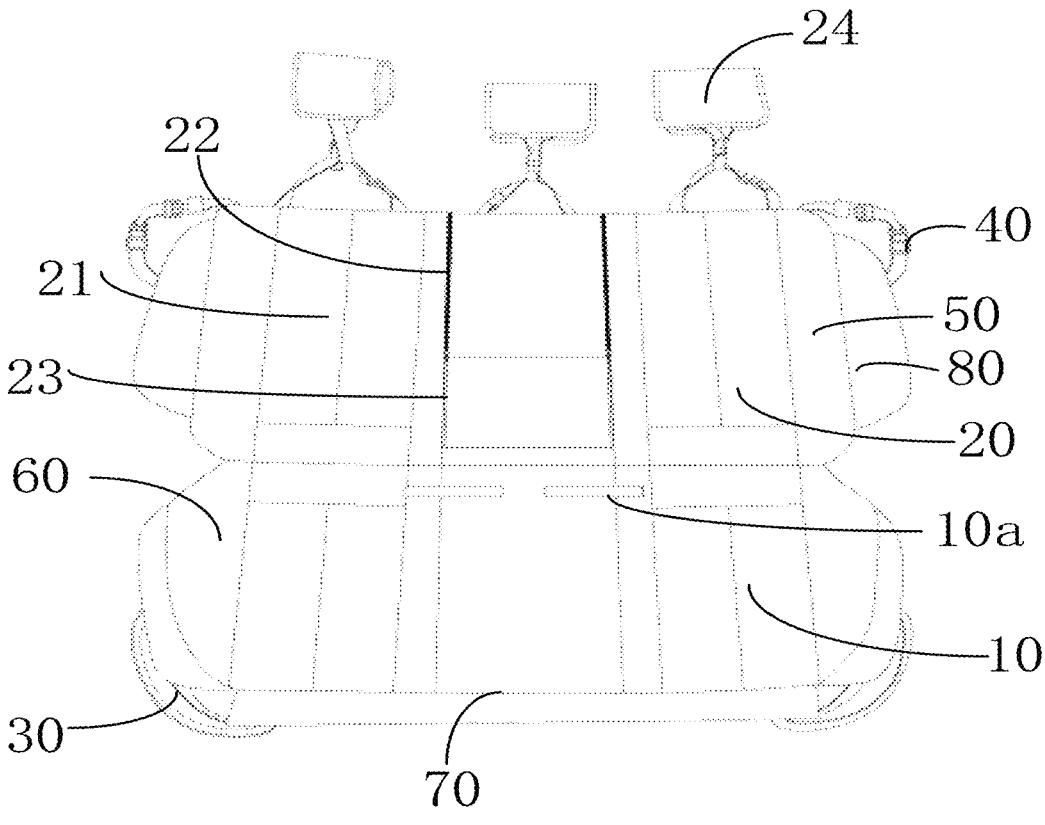
FIG. 4 is a front elevation view showing the zipper in its raised position on the rear-seat protective cover according to the same embodiment.
Figure 5:
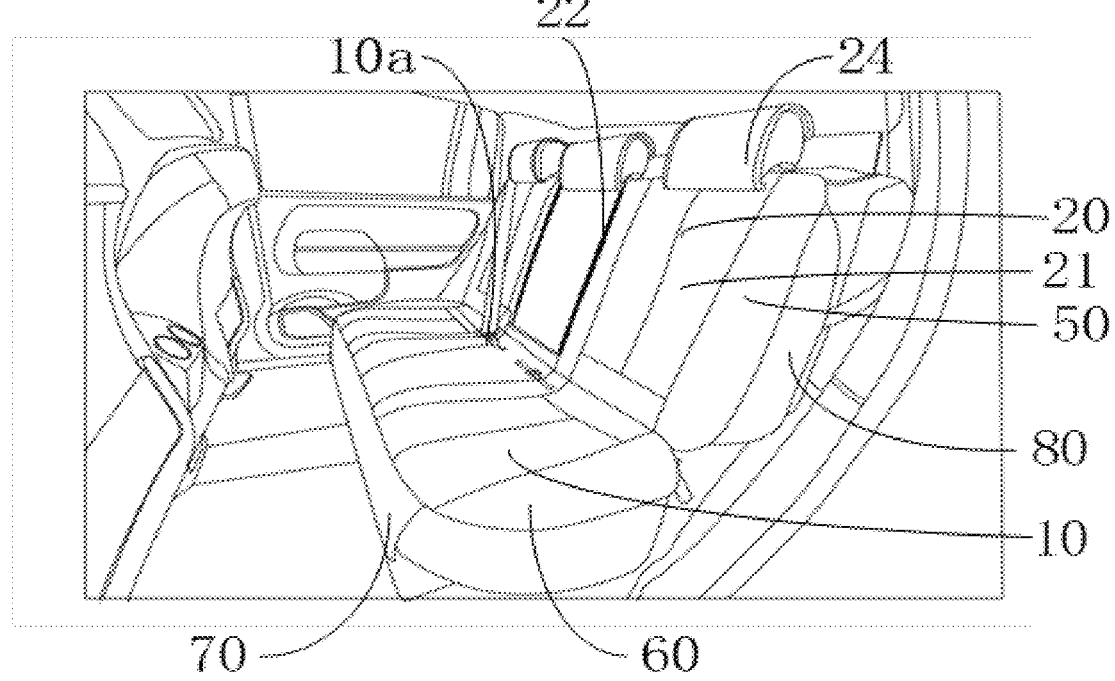
FIG. 5 is a first use-state diagram of the rear-seat protective cover according to the same embodiment.
Figure 6:
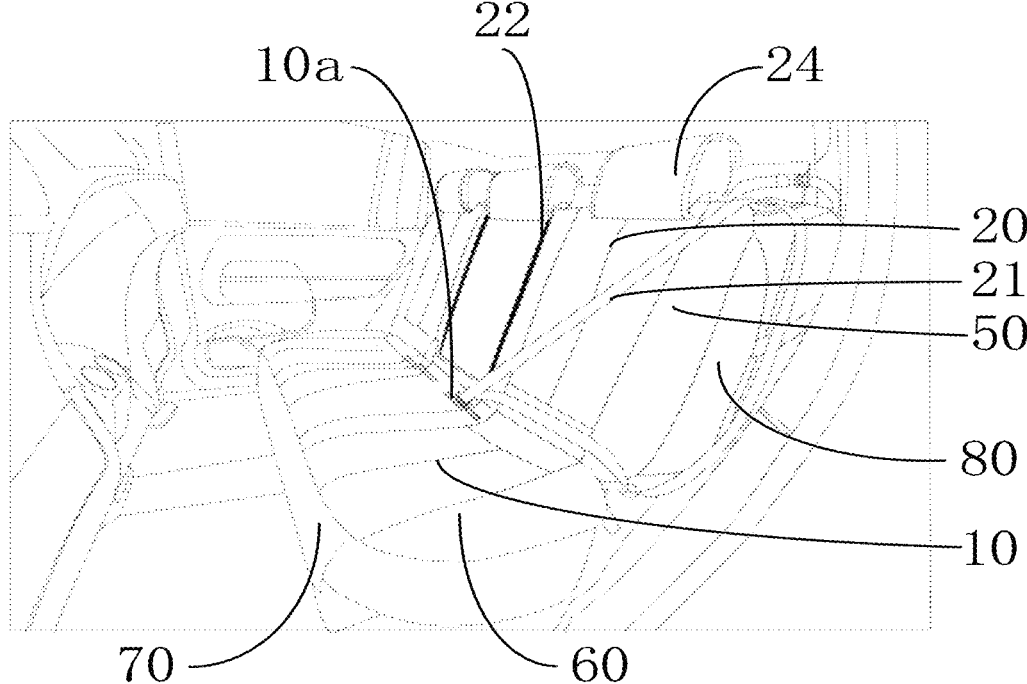
FIG. 6 is a second use-state diagram of the rear-seat protective cover according to the same embodiment.
Figure 7:
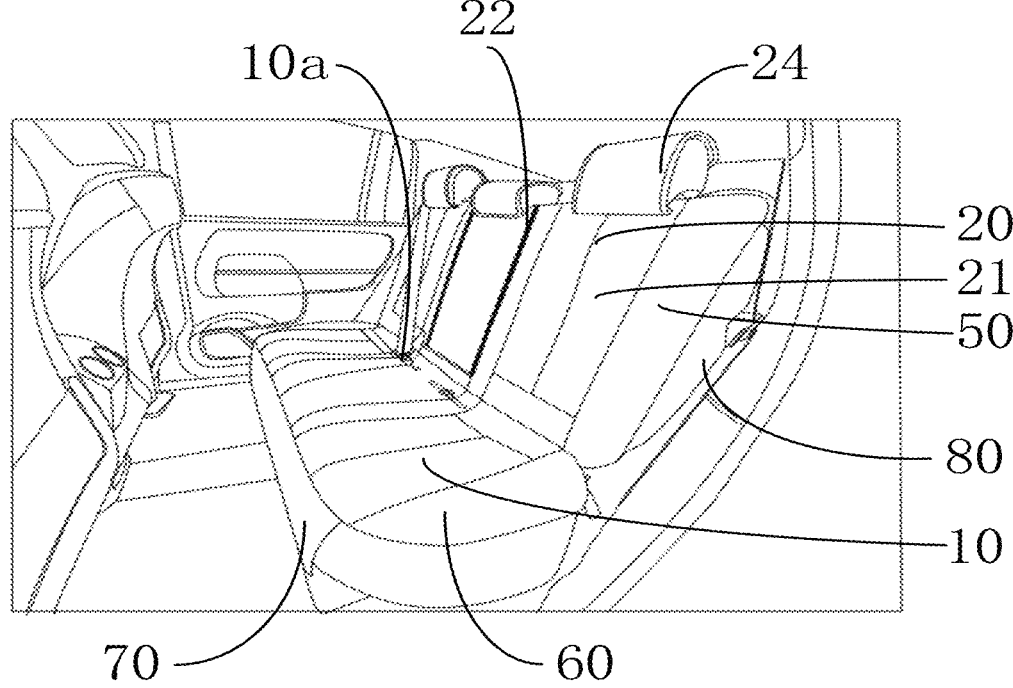
FIG. 7 is a third use-state diagram of the rear-seat protective cover according to the same embodiment.
Figure 8:
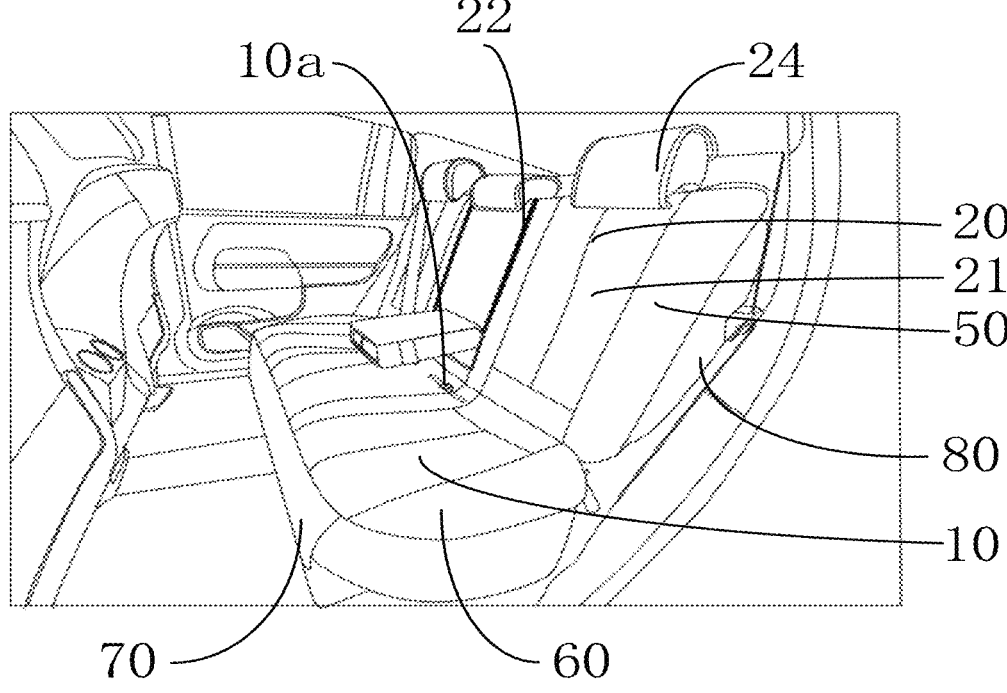
FIG. 8 is a fourth use-state diagram of the rear-seat protective cover according to a second embodiment of the present application.
Figure 9:
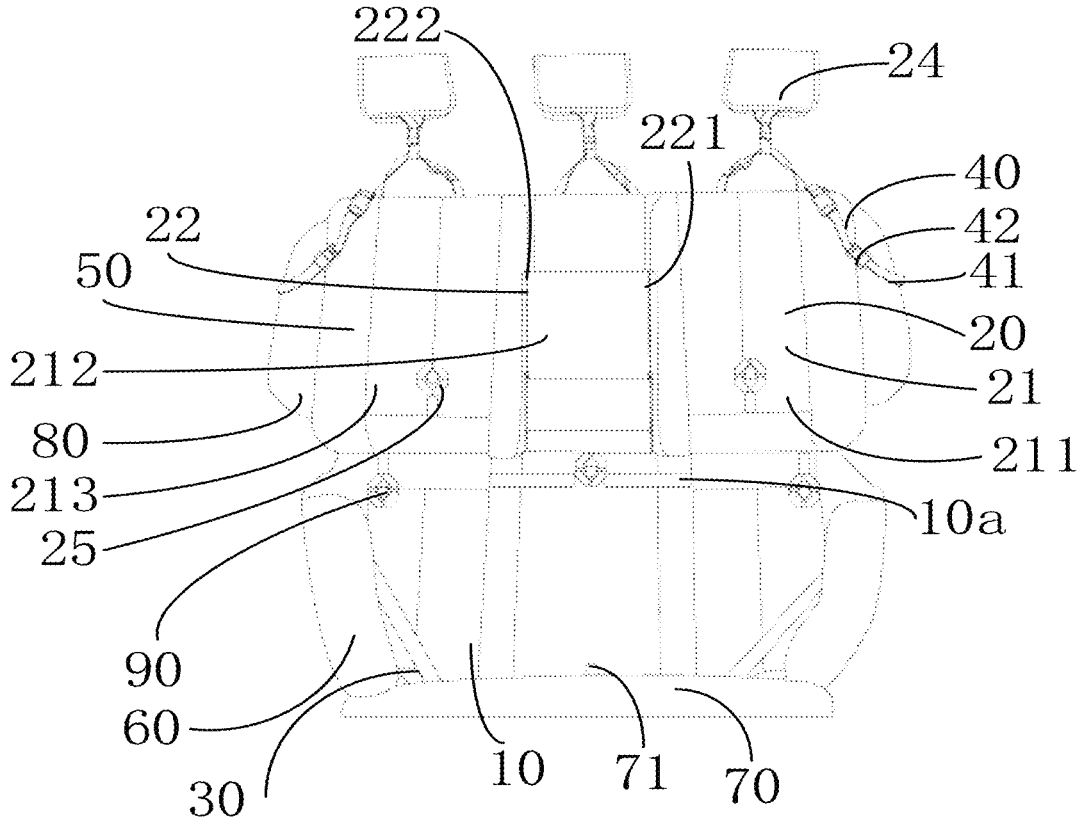
FIG. 9 is a rear elevation view showing the zipper in its raised position on the rear-seat protective cover according to the second embodiment.

With reference to FIGS. 1-9, the present application provides a rear-seat protective cover (100) for use on an automobile's rear seat. The rear-seat protective cover (100) is configured to shield the rear seat from ordinary wear, dirt, and discoloration.

With reference to FIGS. 1-9, in the present embodiment, the rear-seat protective cover (100) comprises a seat-protecting portion (10), a backrest portion (20), a first connecting member (30), and a second connecting member (40). The seat-protecting portion (10) is configured to fit against the rear-seat cushion and support the user's hips; the backrest portion (20) is connected to one side of the seat-protecting portion (10) and is configured to fit against the rear-seat backrest and support the user's back. The backrest portion (20) includes multiple sub-backrest portions (21) arranged in sequence along its length, with adjacent sub-backrest portions (21) joined by a detachable connection; the angle between adjacent sub-backrest portions (21) adjusts in concert with the corresponding seat backrest recline, enabling detachment and angle adjustment of the sub-backrest portions (21) to accommodate various backrest positions and improving the convenience of using the rear-seat protective cover (100).

The first connecting member (30) is attached around the periphery of the seat-protecting portion (10) to connect the seat-protecting portion (10) to the rear-seat cushion, and the second connecting member (40) is attached around the periphery of the backrest portion (20) to connect the backrest portion (20) to the rear-seat backrest; by directly coupling the seat-protecting portion (10) and the backrest portion (20) to the rear seat via the first and second connecting members (30, 40), the installation convenience of the rear-seat protective cover (100) is greatly enhanced.

In some embodiments, the present invention is configured for use with a variety of automobile types, including but not limited to: sedans, which are passenger vehicles featuring four doors and a standard trunk; hatchbacks, offering compact design and a rear door that swings upward to expand cargo space; station wagons, which combine a sedan's comfort with extended storage area and a rear hatch; sport utility vehicles (SUVs), known for increased cargo capacity and off-road capability; crossovers, which blend car-like handling with SUV attributes and are built on passenger car platforms; vans, designed for transporting numerous passengers or bulky cargo, often utilized for commercial or family purposes; multi-purpose vehicles (MPVs), specialized for family use with multiple seating rows and enhanced interior comfort; pickup trucks, consisting of a cab and open rear cargo bed for utility transport; microcars or compact light vehicles, extremely compact automobiles intended for urban environments; and special-purpose vehicles including ambulances, hearses, police vehicles, and delivery trucks, each tailored for specific functional requirements within the scope of land motor vehicles. This broad applicability ensures the invention can be implemented with most standard automotive configurations and classes.

With reference to FIGS. 1-9, the seat-protecting portion (10) is configured to conform to the rear-seat cushion and support the user's hips, thereby protecting the cushion from ordinary wear, dirt, and discoloration.

The backrest portion (20) is connected above the seat-protecting portion (10) and is configured to conform to the rear-seat backrest and support the user's back, thereby protecting the backrest from ordinary wear, dirt, and discoloration. The backrest portion (20) comprises multiple sub-backrest portions (21) arranged in sequence along its length, with adjacent sub-backrest portions (21) joined by detachable connections; the angle between adjacent sub-backrest portions (21) adjusts with the corresponding seat backrest position, permitting detachment and angle adjustment to accommodate various recline settings and enhancing the convenience of the rear-seat protective cover (100).

Between the backrest portion (20) and the seat-protecting portion (10) are an upper-and-lower offset elastic-band fastening buckle (90), each fastener connecting to both the backrest portion (20) and the seat-protecting portion (10) to adjust the height of the backrest portion (20) relative to the rear-seat backrest; the offset configuration accommodates variations in height at the junction of rear-seat cushion and backrest across different vehicle models.

This embodiment of the present application uses an upper-and-lower offset elastic-band fastening buckle (90) to connect the backrest portion and the seat-protecting portion, thereby achieving vertical height adjustment of the backrest portion relative to the rear-seat backrest to accommodate height differences at the connection between the backrest and cushion in different vehicle models. Besides this structure, the following alternative solutions can also achieve this function: Use an adjustable-length strap mechanism, such as hook-and-loop fasteners (Velcro), pin buckles, or sliding buckles, to realize height adjustment between the backrest portion and the seat-protecting portion by adjusting the strap length, which is simple to operate and highly adaptable; Design multi-position eyelets combined with fixing pins or pegs, utilizing different eyelet positions to achieve multi-level height fixing, facilitating easy installation and adjustment; Employ an elastic retractable band combined with guiding rails or sliding grooves, enabling the backrest portion to slide vertically within a certain range, held tightly by the elastic band, balancing adjustability and stability; Adopt stepped or layered connecting structures that allow the backrest portion to be selectively engaged at different height positions, achieving fast and secure height positioning; Combine multi-point fastening straps with routing length adjustment to alter the overall height of the backrest portion, adapting to complex seat deformations in various vehicle models. All the above solutions can realize the height adjustment function between the backrest portion and the seat-protecting portion, ensuring the protective cover's adaptability and comfort across rear seats of multiple vehicle types.

The first connecting member (30) is attached to the seat-protecting portion (10) and disposed around the periphery of the seat-protecting portion (10); the first connecting member (30) is arranged at positions corresponding to the corners of the rear-seat cushion of the vehicle and connects the seat-protecting portion (10) to the rear-seat cushion. The second connecting member (40) is attached to the backrest portion (20) and disposed around the periphery of the backrest portion (20); the second connecting member (40) is arranged at positions corresponding to the corners of the rear-seat backrest of the vehicle and connects the backrest portion (20) to the rear-seat backrest. By directly coupling the rear-seat cushion and the rear-seat backrest through the first and second connecting members (30, 40), rapid installation is achieved and the installation convenience of the rear-seat protective cover (100) relative to the vehicle's rear seat is improved.

In some embodiments, first connecting member and second connecting member can be replaced by following mechanism, the seat cover may be fixed to the rear car seat by employing a range of securing mechanisms tailored for ease of installation, stability, and compatibility with different seat configurations. Exemplary mechanisms include elastic straps and hooks that are stretched beneath the seat and attached to anchor points on the opposite side, thereby ensuring a taut and secure fit; S-hooks or bungee cords, which are attached to designated anchors under the seat; and hook-and-loop fasteners (such as Velcro) sewn onto the underside of the cover, which mate to corresponding surfaces or loops for adjustable tightening. Furthermore, buckles, zippers, snaps, or discs may be incorporated to provide additional fastening options, allowing the seat cover to conform closely to the seat surface and maintain its positioning; as necessary, retaining disks may be threaded through seat slits to mitigate shifting or sliding during use. Where applicable, openings for seat belts, armrests, or console lids can be accommodated by cutting, unzipping, or repositioning specific sections of the cover; elastic loops, drawstrings, or Velcro strips may be tightened to secure the cover along the contours of the backrest and cushion, while integrated connectors or panels facilitate compatibility with vehicles featuring unique seat or console designs. Such arrangements provide for modular, removable, and replaceable sections, enabling efficient installation, adjustment, and maintenance within a broad range of rear car seat environments.

With reference to FIGS. 1-9, in the present embodiment, the bottoms of two adjacent sub-backrest portions (21) are both connected to the same seat-protecting portion (10) but at different locations thereof; a zipper (22) is provided between the two adjacent sub-backrest portions (21) for user operation, and the opening angle between the two adjacent sub-backrest portions (21) is adjusted by pulling the zipper (22), so as to adapt to positional adjustments of the vehicle's rear-seat backrest. Under the action of the zipper (22), the two adjacent sub-backrest portions (21) can be detachably connected and angle-adjusted, thereby avoiding inability to detach multiple sub-backrest portions (21) and improving the usability of the rear-seat protective cover (100). The zipper (22) is movable down to the bottom of the sub-backrest portions (21).

With reference to FIGS. 1-9, in this embodiment each pair of adjacent sub-backrest portions (21) is provided on their opposing sides with a chain-tooth section (23). The zipper (22) is movably engaged with the chain-tooth section (23) and can be repositioned along it, allowing the zipper (22) to slide relative to the sub-backrest portions (21) and thereby facilitate detachable connection and separation of adjacent sub-backrest portions (21).

With reference to FIGS. 1-9, in this embodiment there are three sub-backrest portions (21) arranged side by side along the length of the backrest portion (20). The center sub-backrest portion (21) can contract as the zipper (22) is repositioned, thereby exposing a local opening through which the rear-seat armrest may be inserted. This accommodates armrests of different heights across vehicle models, ensuring they can fold down as intended. When the armrest is not in use, lowering the zipper (22) closes the chain-tooth sections (23), concealing the zipper (22) and preventing direct contact with passengers.

The zipper assembly (22) comprises two separate zippers: a first zipper (221) and a second zipper (222). The three sub-backrest portions (21) are designated as a first sub-backrest portion (211), a second sub-backrest portion (212), and a third sub-backrest portion (213), with the second sub-backrest portion (212) positioned between the first sub-backrest portion (211) and the third sub-backrest portion (213). The first zipper (221) is arranged between the first sub-backrest portion (211) and the second sub-backrest portion (212), enabling detachable coupling therebetween. The second zipper (222) is arranged between the second sub-backrest portion (212) and the third sub-backrest portion (213), enabling detachable coupling therebetween.

When the first zipper (221) is pulled upward from its lower end, the vehicle's left rear-seat backrest can be folded down. When the second zipper (222) is pulled upward, the vehicle's right rear-seat backrest can be folded down. When both the first zipper (221) and the second zipper (222) are pulled upward simultaneously, either the left or right rear-seat backrest can be folded down. This arrangement permits multiple folding configurations of the backrests, accommodating a variety of user requirements for expanding the vehicle's rear cargo space.

In some embodiments, the present invention incorporates zipper functionality compatible with a wide variety of mechanisms, enabling secure closure, easy access, and enhanced utility. Representative examples of zipper mechanisms suitable for integration include coil zippers, metal zippers, and molded plastic zippers. A coil zipper features a spiral coil made from nylon or polyester, delivering high flexibility and smooth operation, common in apparel, bags, and curved seams. Metal zippers utilize interlocking metal teeth crimped onto fabric, providing exceptional durability for applications requiring strength such as jeans, jackets, and heavy-duty gear. Molded plastic zippers employ plastic teeth formed directly on the zipper tape, combining durability with corrosion resistance for outdoor, luggage, and marine environments. Additionally, specialty mechanisms include concealed (invisible) zippers for aesthetic purposes, reversible zippers with dual sliders for multidirectional access, separating zippers for full-width opening, and waterproof or marine-grade zippers designed to withstand harsh environmental conditions. Each of these mechanisms features a slider assembly, typically comprising lever action, wedge-shaped teeth, and sometimes tension springs or pulley systems to ensure reliable operation and stable closure under varying loads.

In some embodiments, regarding the functions of the "first zipper 221" and "second zipper 222" described in this application, which achieve independent folding down of the left and right backrest positions of the automobile's rear seat and allow multiple folding configurations, alternative structural approaches can also realize similar effects besides the zipper mechanism. For example, magnetic connection mechanisms may be employed, with magnetic clasps arranged at the edges of adjacent sub-backrest units to enable quick detachment and angle adjustment; elastic buckle structures can be used to allow separation of the backrest units via pressing and releasing; pin-type connectors may facilitate modular assembly and disassembly; flexible strap materials paired with tension-adjustment mechanisms can dynamically adjust the connections between backrest units; These alternative schemes all meet the requirements for independent control and multi-angle folding of different backrest positions, adapting to diverse vehicle models and usage scenarios, thereby enhancing the flexibility of rear seat storage space expansion and improving user experience.

With reference to FIGS. 1-9, in this embodiment the rear-seat protective cover (100) further includes a first covering flap (50) attached to one of the sub-backrest portions (21). The first covering flap (50) can pivot rearward relative to its corresponding sub-backrest portion (21) to conform to the edge of the vehicle's rear-seat backrest, thereby protecting that edge from daily wear, soiling, and fading.

The cover (100) also includes a second covering flap (60) attached to the seat-protecting portion (10). The second covering flap (60) can pivot downward relative to the seat-protecting portion (10) to conform to the edge of the vehicle's rear-seat cushion, thereby protecting that edge from daily wear, soiling, and fading.

With reference to FIGS. 1-9, in this embodiment the cover (100) further includes a front apron flap (70) connected to the forward support arm of the seat-protecting portion (10). The front apron flap (70) can bend downward relative to the seat-protecting portion (10) to conform to the front edge of the vehicle's rear-seat cushion, thereby protecting that front edge from daily wear, soiling, and fading.

The front apron flap (70) carries one or more hooks (71) that engage beneath the seat to secure the flap and ensure the protective cover (100) lies flat and snug against the floor.

The cover (100) further includes side skirt flaps (80) attached to the second covering flap (60) and bending laterally to wrap the inner side of the rear-seat. The side skirt flaps (80) fully cover and protect the inner seat side from wear, soiling, and fading. For compact sedans, the combination of the front apron flap (70) and the side skirt flaps (80) can be tucked into the seat's front and side crevices. For larger vehicles, they can extend across the seat face to accommodate varied interior geometries and ensure compatibility with a wider range of models.

With reference to FIGS. 1-9, in this embodiment the seat-protecting portion (10) is provided with two safety-buckle through-holes (10a). Each safety-buckle through-hole (10a) is configured to receive and expose a vehicle seat belt buckle, allowing the seat-protecting portion (10) to avoid interference with the seat belt hardware. This arrangement enables the protective cover to remain installed while permitting the user to fasten the seat belt, thereby ensuring passenger safety.

In some embodiments, the belt-buckle through-hole is designed according to the size specifications of seat belt buckles for different vehicle models, with typical dimensions ranging from 4 cm to 6 cm in width and 7 cm to 10 cm in length, and the exact size can be fine-tuned based on the specific vehicle's seat belt buckle dimensions. The position of the belt-buckle through-hole is arranged within a reserved area of the seat-protecting portion to ensure smooth passage and external exposure of the seat belt buckle, facilitating quick fastening and unfastening by the occupant. The edges of the belt-buckle through-hole are reinforced with stitching and wrapped with wear-resistant materials to prevent deformation or damage caused by friction during use, thereby ensuring the stability and durability of the seat belt buckle interface. The overall design of the protective cover guarantees no jamming occurs between the seat belt buckle and the cover, avoiding any obstruction to the rapid release and locking functions of the seat belt, effectively enhancing occupant safety. After installation of the protective cover, the visibility and accessibility of the seat belt buckle remain fully ensured, complying with current automotive safety standards and regulations regarding seat belt operability, thus safeguarding driving safety and occupant interests.

With reference to FIGS. 1-9, in this embodiment both the first connector (30) and the second connector (40) are mounted on the rear side of the vehicle's rear seat in a diagonal orientation. The second connector (40) comprises an elastic strap (41) and an associated length-adjustment buckle (42). The elastic strap (41) is looped through the length-adjustment buckle (42) to permit precise adjustment of its effective length, accommodating a variety of vehicle seat geometries and ensuring a snug fit of the seat-protecting portion (10) and the backrest portion (20) against the rear seat. The elastic strap (41) can be routed around the vehicle's shoulder belts to avoid obstructing them and then secured to both sides of the seat. Optionally, the first connector (30) may also be formed as an elastic strap.

With reference to FIGS. 1-9, in this embodiment each sub-backrest portion (21) carries a head-cap (24). The head-cap (24) is attached to its respective sub-backrest portion (21) via an elastic strap (41) that loops around the headrest. Because the height and spacing of rear headrests vary significantly between vehicle models, the elastic strap (41) spans between two ends of the head-cap (24) and is tensioned through the central length-adjustment buckle (42). The inherent elasticity of the strap (41) accommodates different headrest shapes and positions.

With reference to FIGS. 1-9, in this embodiment the head-cap (24) is removably attached to the vehicle's headrest so that it can be connected or detached as needed. This allows the same protective cover to adapt to three rear-seat configurations: integrated headrests, split headrests, or headrests that are entirely absent.

The first sub-backrest portion (211) and the third sub-backrest portion (213) each carry a T-anchor plate (25). Each T-anchor plate (25) is secured to the elastic strap (41) and is sized to slide into the gap between the backrest and the seat cushion, where its T-shape engages and locks the protective cover (100) to the seat, preventing slippage and ensuring stable positioning.

Furthermore, in this embodiment, the protective cover is made of multifunctional composite materials, balancing environmental protection, abrasion resistance, waterproofing, and flame retardancy to meet the comprehensive requirements of automobile seat protection. The seat-protecting portion and backrest portion primarily utilize high-strength polyester fiber fabric, coated with a PU waterproof layer on the surface, effectively resisting liquid penetration and stain adhesion, and facilitating easy daily cleaning. The selected materials comply with national environmental protection standards, feature low formaldehyde content and are odorless, ensuring that the in-car air quality remains unaffected and enhancing passenger comfort. The fabric exhibits excellent abrasion resistance, maintaining integrity after multiple friction tests, thereby prolonging the service life of the protective cover. Regarding fire safety, the seat materials undergo flame-retardant treatment to effectively inhibit the spread of open flames, conforming to automotive interior flame-retardant safety regulations and ensuring the safety of occupants' life and property. Additionally, the materials possess good breathability and elasticity, adapting to varying seat shapes and adjustment requirements, thereby increasing riding comfort. The material selection balances practical performance with cost-effectiveness, ensuring the product maintains quality while remaining competitive in the market.

Compared to the prior art, the present utility model offers the following advantages:

The protective cover (100) includes a seat-protecting portion (10) that conforms to the rear-seat cushion and supports the occupant's hips, and a backrest portion (20) that conforms to the rear-seat backrest and supports the occupant's torso. The backrest portion (20) comprises multiple sub-backrest portions (21) arranged in sequence along its length; adjacent sub-backrest portions (21) are detachably connected and automatically adjust their inter-segment angles to match the vehicle's adjustable backrest positions. This design allows the sub-backrest portions (21) to be removed and their angles adjusted, accommodating the full range of rear-seat recline positions and avoiding the limitations of non-detachable, fixed backrest segments. The first connector (30) attaches to the seat-protecting portion (10) around its perimeter to secure the cover to the seat cushion, and the second connector (40) attaches to the backrest portion (20) around its perimeter to secure the cover to the seat back. This dual-connector arrangement provides direct attachment to both the cushion and backrest, greatly simplifying installation of the protective cover (100) on the vehicle's rear seat.

In the foregoing embodiments, each example has been described with an emphasis on certain aspects; features not described in detail in one embodiment may be found in the descriptions of other embodiments.

It should be noted that all directional terms used in this specification—such as "upper," "lower," "left," "right," "front," and "rear"—are provided solely to illustrate the relative positions and movement of components in a given orientation. If the orientation changes, the corresponding directional terms should be interpreted accordingly.

Furthermore, when one component is described as being "fixed to" or "disposed on" another component, it may be directly attached to that component or indirectly attached via one or more intermediate components. Likewise, when a component is described as being "connected to" another component, that connection may be direct or may be effected through one or more intermediate components.

In addition, the terms "first," "second," and the like are used only for descriptive purposes and are not intended to imply any relative importance or to specify the number of technical features. Accordingly, a feature described as "first" or "second" may encompass one or more such features, whether explicitly stated or implied.

The foregoing detailed examples are provided to illustrate the principles and implementation of the invention and are not intended to limit its scope. Those skilled in the art, guided by the concepts disclosed herein, may make various modifications and adaptations of these embodiments without departing from the spirit and scope of the invention.

The invention claimed is:

1. A protective cover for use with the rear seat of a vehicle, wherein the rear seat includes a rear seat cushion and a rear seat backrest, comprising:

a seat protecting portion, configured to fit onto the rear seat cushion of said vehicle and to support the user's hips;

a backrest portion, connected to and positioned adjacent to one side of the seat protecting portion, configured to fit onto the rear seat backrest of said vehicle and to support the user's back;

wherein the backrest portion includes multiple sub-backrest units arranged sequentially along the lengthwise direction of the backrest portion, with each pair of adjacent sub-backrest units being detachably connected; and the angle between each adjacent pair of sub-backrest units is adjustable in coordination with adjustments of said rear seat backrest position;

an upper-and-lower offset elastic-band fastening buckle provided between the backrest portion and the seat protecting portion, with the fastening buckle respectively connected to the backrest portion and the seat protecting portion to adjust the vertical position of the backrest portion relative to the rear seat backrest;

a first connecting member, attached around the periphery of the seat protecting portion, configured to secure the seat protecting portion to the rear seat cushion; and a second connecting member, attached around the periphery of the backrest portion, configured to secure the backrest portion to the rear seat backrest.

2. The protective cover of claim 1, wherein bottoms of two adjacent sub-backrest units are both connected to the same seat protecting portion at different lateral locations thereof, and the sub-backrest units remain integrally continuous along an upper edge thereof during middle sub-backrest contraction, while gear-tooth tracks are formed on facing sides of each pair of adjacent sub-backrest units; and wherein a zipper is movably engaged with the gear-tooth tracks for user operation, whereby sliding the zipper adjusts an opening angle between the adjacent sub-backrest units to accommodate changes in said rear seat backrest position while permitting selective contraction of a middle sub-backrest unit to form an armrest passage without disrupting said upper edge continuity.

3. The protective cover of claim 2, wherein there are three sub-backrest units arranged side-by-side along the length of the backrest portion, and the middle one of the sub-backrest units is configured to contract when the zipper is adjusted, thereby accommodating a center armrest box of varying size.

4. The protective cover of claim 3, wherein the backrest portion comprises three sub-backrest units arranged side-by-side along the length of the backrest portion, and wherein a first zipper is provided between a first sub-backrest unit and a middle sub-backrest unit and a second zipper is provided between the middle sub-backrest unit and a third sub-backrest unit, the first and second zippers being movably engaged with respective gear-tooth tracks on the facing sides of the adjacent sub-backrest units; wherein coordinated sliding of the first and second zippers along the respective gear-tooth tracks permits (i) selective contraction of the middle sub-backrest unit to form an armrest passage while exposing a center armrest box through said armrest passage, with the first and third sub-backrest units remaining in their respective upright positions, and (ii) independent or simultaneous folding of the first and/or third sub-backrest unit(s) to follow folding of corresponding vehicle seat backrest portions without any requirement of upper-edge continuity during such folding; and wherein, when the middle sub-backrest unit is contracted to form the armrest passage while the first and third sub-backrest units remain in their respective upright positions, an upper edge of the backrest portion remains continuous across the first, middle and third sub-backrest units (i.e., no opening or gap is formed at the upper edge between adjacent sub-backrest units during such contraction).

5. The protective cover of claim 1, further comprising a first covering piece connected to one of the sub-backrest units and pivotable rearward relative to that sub-backrest unit to conform to an edge of said rear-seat backrest; and a second covering piece connected to the seat protecting portion and pivotable downward relative to the seat protecting portion to conform to an edge of said rear-seat cushion.

6. The protective cover of claim 5, further comprising lateral side ears on opposite sides of the backrest portion and the seat protecting portion, each side ear being coupled to an adjustable tightening strap and buckle assembly so as to cinch the protective cover laterally against the seat sides; a front apron piece connected to a front support arm of the seat protecting portion and pivotable downward relative to the seat protecting portion to conform to a front edge of said rear-seat cushion; and a side blocking piece connected to the second covering piece and bendable relative to the second covering piece to fully wrap an inner side of said rear-seat.

7. The rear-seat-protective cover of claim 1, wherein the seat protecting portion defines a safety-buckle through-hole for passage and exposure of a seat-belt buckle.

8. The protective cover of claim 1, wherein the first connecting member and the second connecting member are slung over the rear of said vehicle seat, wherein the second connecting member comprises an elastic band and a corresponding length-adjustment buckle to permit length adjustment.

9. The protective cover of claim 1, wherein each sub-backrest unit is equipped with a head-cap attached by said elastic band of the second connecting member to the corresponding sub-backrest unit and configured to envelop a headrest of said rear-seat.

10. The protective cover of claim 9, wherein each head cap is removably attached to said headrest via the elastic band tensioned by the length-adjustment buckle, such that the protective cover is usable with seats having integrated, separate, or no headrests.

\* \* \* \* \*